April 25, 1967 P. H. MERDINYAN ET AL 3,315,748
FIRE PROTECTION VALVE
Filed June 25, 1965 5 Sheets-Sheet 4

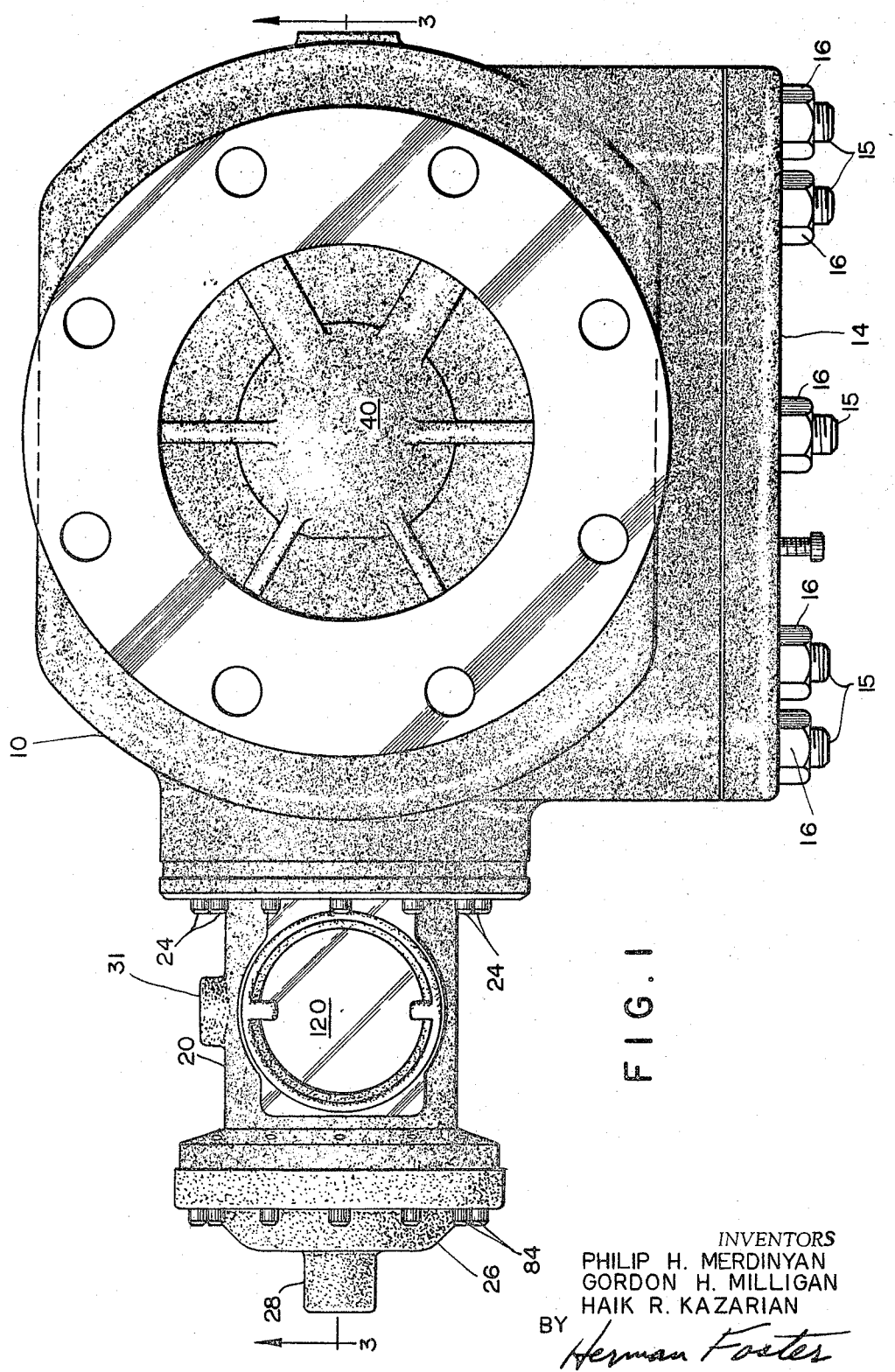

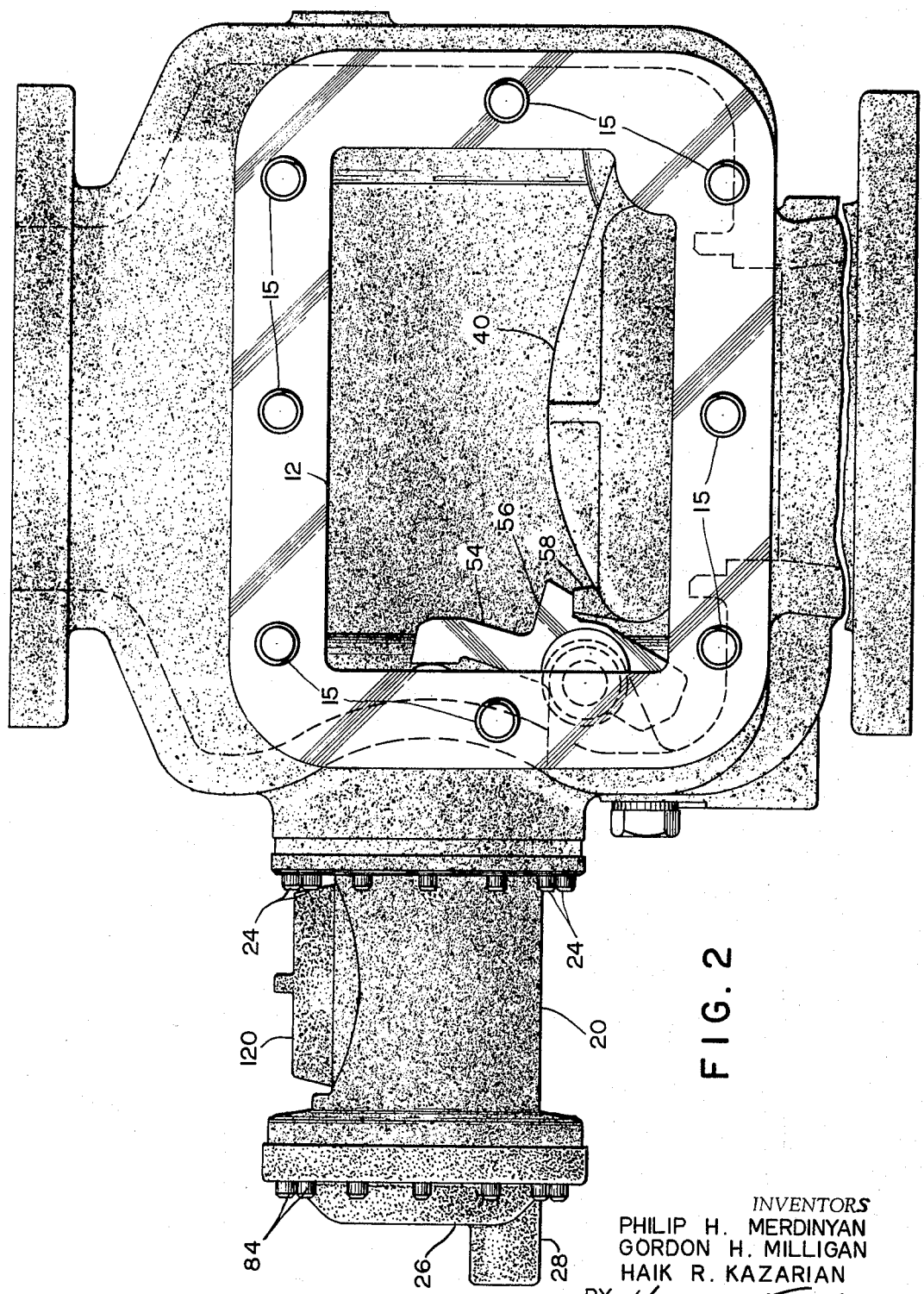

INVENTORS
PHILIP H. MERDINYAN
GORDON H. MILLIGAN
HAIK R. KAZARIAN
BY Herman Foster
ATTORNEY April 25, 1967 P. H. MERDINYAN ET AL 3,315,748
FIRE PROTECTION VALVE
Filed June 25, 1965 5 Sheets-Sheet 5

INVENTORS
PHILIP H. MERDINYAN
GORDON H. MILLIGAN
HAIK R. KAZARIAN
BY Herman Foster
ATTORNEY United States Patent Office 3,315,748
Patented Apr. 25, 1967

3,315,748
FIRE PROTECTION VALVE
Philip H. Merdinyan, East Greenwich, Gordon H. Milligan, Pawtucket, and Haik R. Kazarian, Providence, R.I., assignors to Grinnell Corporation, Providence, R.I., a corporation of Delaware
Filed June 25, 1965, Ser. No. 466,941
11 Claims. (Cl. 169—19)

This invention relates to improvements in valves, and more particularly to an improved high speed valve for use with fire protection systems on materials which burn at an exceedingly high rate of speed.

The materials with which this invention is particularly concerned are those whose rates of combustion are so rapid that they may be termed to burn explosively. Such a material is solid rocket fuel.

In U.S. Patents Nos. 3,064,739 and 3,135,330 there are disclosed high speed fire extinguishing systems which utilize electrically operated, explosively actuated, valves to obtain high speed operation of the systems. The valves disclosed for use in these systems do not readily lend themselves to actuation by non-electrical means or manual actuation. The systems disclosed in the aforesaid patents are primarily directed to solve the problem of fires starting in the highly combustible material which is to be protected. However, there are times when a fire may start in an area away from such material when it is being manufactured or stored. Therefore, either manual operation of the fire protection system or actuation by a detection system operated by means other than electrical may be required. In either case it is still necessary to flood the combustible material being manufactured or stored to protect it from being ignited by the fire at an external source. Since the flooding of such material as rocket fuel requires large amounts of water, systems used to supply such quantities are often referred to as deluge systems. The main valves in such systems are often referred to as deluge valves.

The present invention relates to a deluge valve which may be actuated either manually or by an actuation system operated by means other than electrical. In addition the valve may also be actuated by an electrical detection system such as that revealed in the above mentioned patents. While the present invention lends itself to use with systems other than electrically operated detection systems it is still necessary that the present valve have the ability to operate in as short time as the valves disclosed in the aforesaid patents should an electrical actuation occur as a result of fire in the combustible material being manufactured or stored.

Accordingly, it is an object of this invention to provide a fire protection valve, for a high speed fire protection system, which may be quickly actuated manually, or by electrical actuation devices, or by non-electrical devices.

Another object of this invention is to provide a fire protection valve for a high speed fire protection system which, when actuated electrically, will attain a high speed of operation by explosive means.

Other objects and advantages of the present invention will become apparent from the detailed description which follows when considered in conjunction with the accompanying drawings.

The best mode contemplated for applying the principles of our invention is shown and described herein, but this is deemed merely illustrative for it is intended that the patent shall cover by suitable expression in the appended claims whatever features of patentable novelty exist in the invention disclosed.

In the drawings:

FIG. 1 is a top plan view of a deluge valve embodying the principles of the present invention and showing the external relationship of various components;

FIG. 2 is a front elevation view of the device of FIG. 1 with the side cover plate removed;

Figure 6:
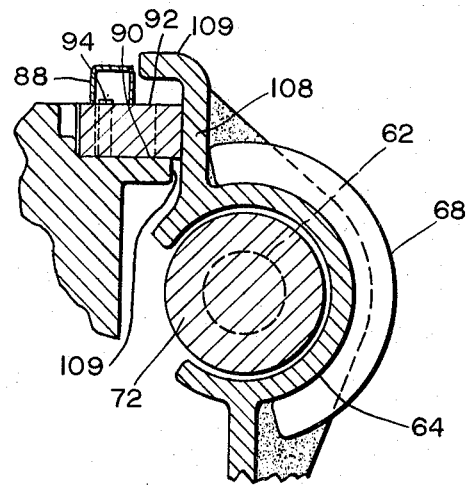
FIG. 6 is a sectional view at an enlarged scale of a portion of the actuating mechanism taken along line 6—6 of FIG. 3.

Referring more particularly to the drawings, FIGS. 1 and 2, the deluge valve contains a main body casing 10, with an access opening 12 in one side. This opening, often referred to as a handhole, is normally closed by a cover plate 14 which is held in place by a plurality of nuts 16 turned down on bolts 15.

Joined to the wall of an adjacent side of the casing 10 is a substantially hollow, cylindrically shaped, container 20. This container covers an opening 22 (see FIG. 5) in the side of casing 10 and is held in place by a plurality of bolts 24. At the extreme outer end of container 20 is a cover member 26 which contains an extending boss 28.

In FIGS. 3-6 the interior construction of the entire combination is depicted. Within casing 10 is a clapper 40 which is pivotally fastened to the casing 10 by means of a hinge pine 42. The clapper 40 contains an elastomer sealing member 44 which is held in place by a retainer member 46 and a bolt 47 which connects the clapper and retainer member. When the clapper is in closed position the sealing member 44 engages a seat ring 48 of the valve inlet 50.

Pivoted on another hinge pin 52 joined to casing 10, is a latch 54 which has an outstanding finger 56 for engagement with an upstanding abutment 58 on the clapper 40. The latch 54 has, at its upper end, a flat abutment face 60 against which a slidable rod section 62 can impinge.

This rod section 62 is contained within the hollow cylinder 20 and is part of the actuating mechanism for the entire deluge system. The cylinder 20 is normally constructed to be explosion proof. Therefore, the container has an inner end plate 23 with a central extended bushing 25 through which rod section 62 slides forward and back. Since the deluge valve is normally used in a primed condition, water under pressure is present in the chamber 51 of the valve. Therefore an O-ring 27 in a circular groove in the rod section 62 is used to seal the passage between the rod section and the bushing 25. In addition to the rod section 62 the actuating mechanism contains a ball retainer latch 64 which is pivotally connected to a hinge pin 66 fastened to the lower portion of the cylinder 20. To protect the latch 64 against any impact shocks, a bumper member 68 is fastened to the outside surface of the ball retainer latch. Within the ball retainer latch 64 is ball 72 which acts to maintain a fixed spaced separation between the rod section 62 and a second rod section 73 which is joined to a flange assembly 74.

The ball is maintained in contact with the inner ends of the rod sections 62 and 73 when the actuator is set. These inner ends are shown to be tapered (see FIG. 5) which lessens the transverse distance the ball 72 must travel before release of rod section 62 occurs. The entire combination of rod section 62, ball 72 and rod section 73 will be referred to generally as a pushrod. To prevent the pushrod from being set too far into bushing 25, a limit pin 29 is set into the inner end of rod section 62.

Between the flange assembly 74 and the ball 72 is a diaphragm retainer member 76 which has a centrally oriented bushing 78 through which the rod section 73 can slide. A diaphragm 80 is retained within a chamber 82 formed by the diaphragm retainer 76 and the cover member 26. The cover member 26 utilizes bolts 84 as the means by which the cover and diaphragm are held in place against the flange assembly member 76. The diaphragm thus acts to seal this end of the cylinder 20 and with the cover member 26 completes the explosion proof nature of container 20. The diaphragm illustrated is made of an elastomer. However, it is possible that a metallic diaphragm such as a bellows may, under some circumstances, be desirable. It is intended therefore that the term "diaphragm" be broad enough to encompass a bellows construction. An access opening 86 in the boss 28 permits the passage of pilot fluid into the chamber 82.

Integral with the interior side walls of the cylindrical container 20 is a horizontal ledge 90 on which a metal primer holder is fastened. The fastening is accomplished by two steel pins 93 and 94 which pass in abutting relation to outstanding flanges 96 and 97 on primer holder 92 and into holes 98 and 99 in the ledge 90 to prevent lateral movement of the holder. A thumb screw 87 which is fastened to stud 91 and bears on an adjustable channel shaped stop 88 prevents any upward displacement of the primer holder 92. A spring 89 about the stud 91 and beneath the stop 88 simplifies the adjustability of the stop by urging the stop away from the primer holder 92 when the thumb screw 87 is loosened.

Figure 5:
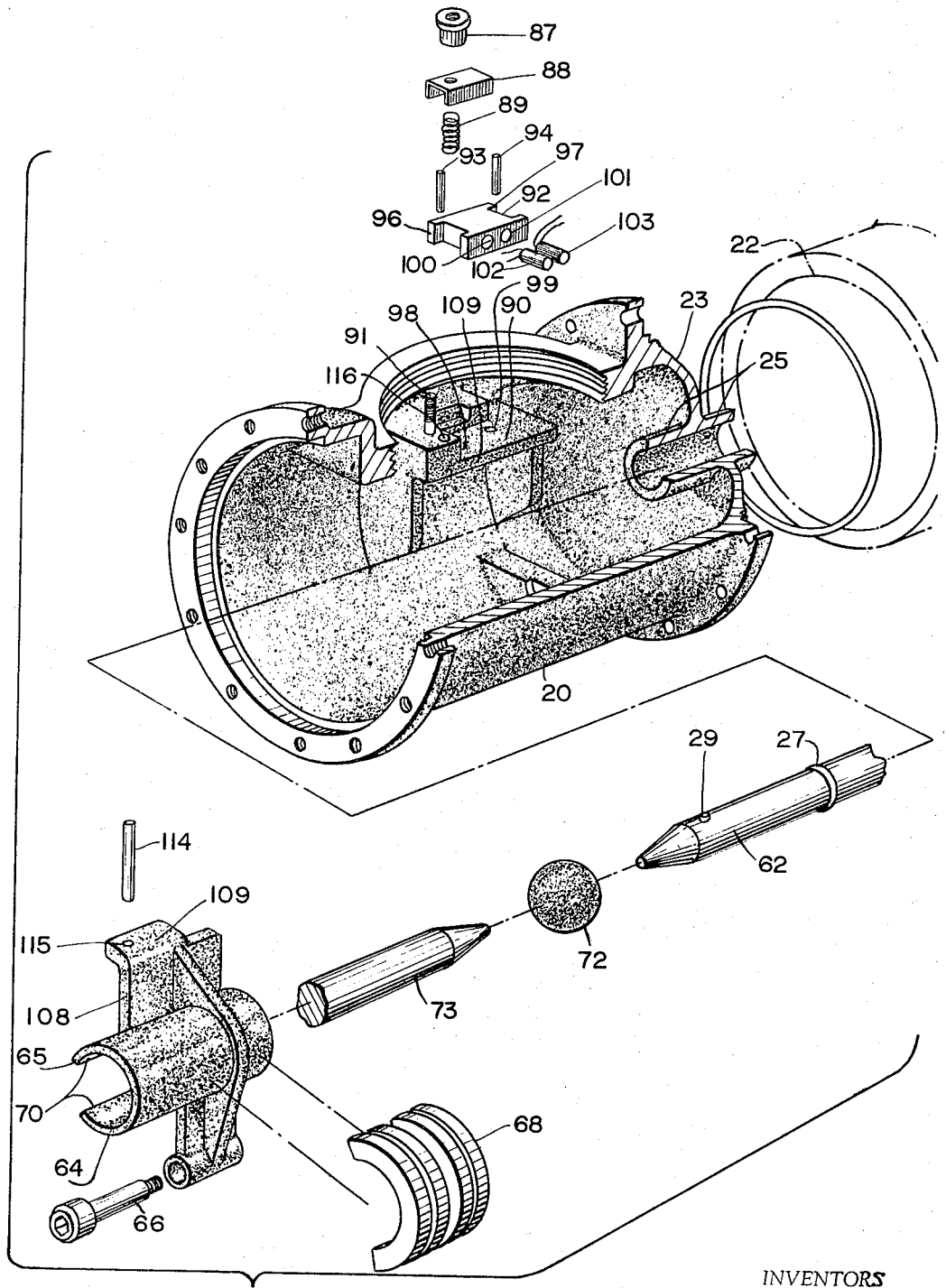
FIG. 5 is an exploded detail perspective of the actuating container of our novel deluge valve.

The primer holder 92 has two cylindrical holes 100 and 101 drilled therein to contain primers 102 and 103 as shown in FIG. 5. These primers have attached extending pigtails which extend out of the rear portions (not shown) of holes 100 and 101 and are connected to appropriate wires such as 107 (see FIG. 4) which are connected to the detector ignition means. These wires are brought into the interior of the container 20 through a boss 31 which is internally threaded for connection to an electrical conduit and thus maintains the explosion proof nature of the container 20 and provides a vent for the gases generated by the primers upon ignition.

Fastened to a side of ledge 90 is a small switch 105 which is used as an alarm actuator and transmits an alarm signal through wires 110 when the primers 102 and 103 are ignited. The switch is actuated by the release of spring blade 106 which is retained in a set position by the lip 65 on the ball retainer latch 64.

The ball retainer latch 64 has an upstanding anvil portion 108 which terminates in a right angle flange 109 over the inner edge 111 of the horizontal ledge 90.

In its set position the ball retainer latch 64 is oriented so that the anvil member 108 is in a substantially vertical position abutting the ends of the primers 102 and 103. The latch is held fixed in this position by a plastic shear pin 114 which extends through a hole 115 in the flange 109 and into a hole 116 in the ledge 90.

Since the primers 102 and 103 are expendable, access must be available to the interior of container 20 after each operation of the valve. This is accomplished by means of a removable cover plate 120 which is threadedly engaged with the top of the container 20.

Figure 3:
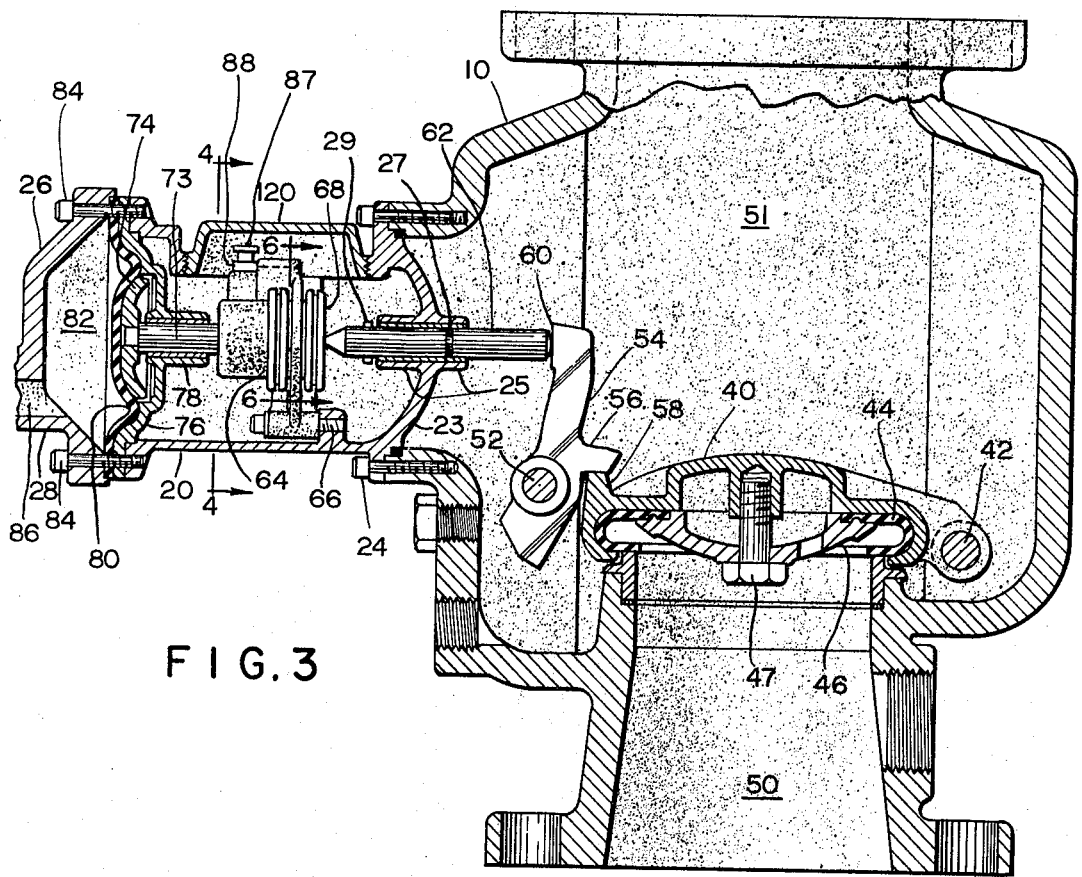
FIG. 3 is a partial sectional view taken along line 3—3 of FIG. 1.
Figure 4:
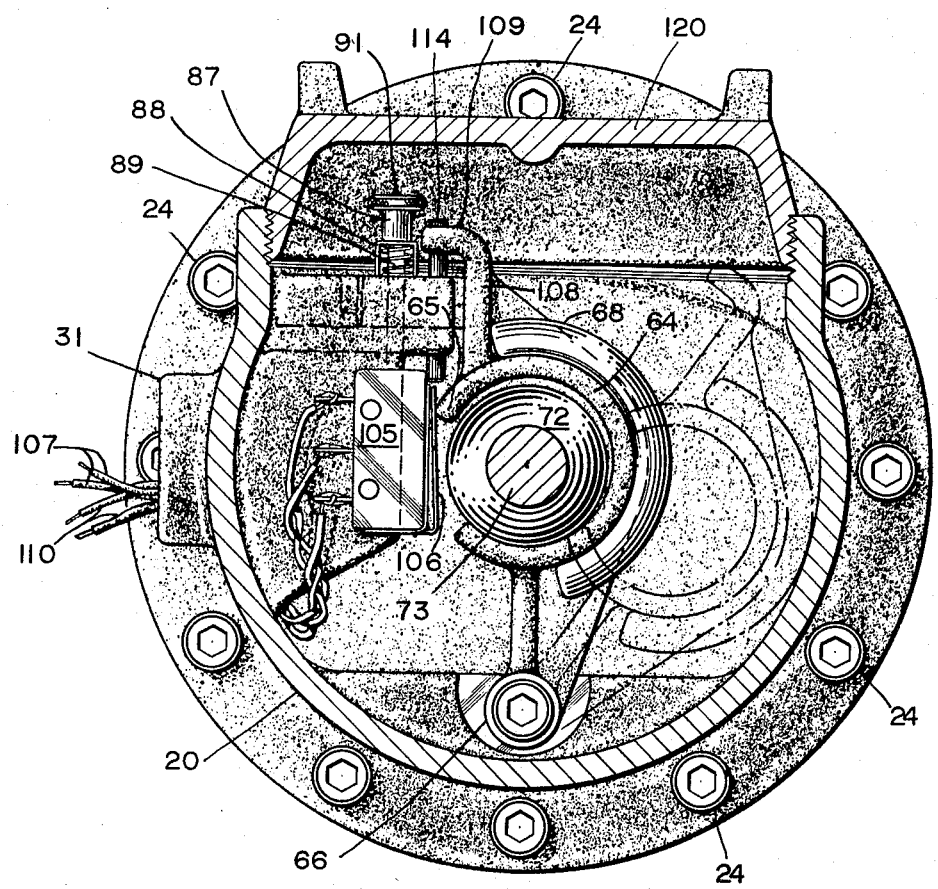
FIG. 4 is a sectional view taken along line 4—4 of FIG. 3.

In operation the deluge valve is generally set as shown in FIG. 3 with the clapper 40 closed and held shut by the latch 54. The pushrod 62–72–73 engages the abutment face 60 of the latch and is held this way by liquid pressure which is transmitted from the passage 86 into the chamber 82 and impinges on the diaphragm 80. The passage 86 which is in the boss 28 is part of a pilot device (not shown) normally attached into the liquid supply line to maintain the same pressure in the chamber 82 as exists in the inlet 50.

Should an external fire occur at a distance from the combustible material being manufactured or stored then pressure release means (not shown) in the pilot device are actuated either manually (e.g. a break glass) or by mechanical means (not shown) to release the pressure in chamber 82 so that the diaphragm 80 may move to the left with pushrod 62–72–73. This movement occurs because the pressure in the inlet 50, without a counter-acting pressure in chamber 82, is sufficient to push the clapper upwardly against the outstanding finger 56 and thus cause the latch 54 to rotate in a counter-clockwise direction (see FIG. 3). This motion of the latch causes the abutment face 60 to push the pushrod 62–72–73 to the left without any resistance to such movement. Thus the valve is actuable by non-electrical means caused by a fire externally of the material being protected and flow will proceed immediately due to the primed nature of the chamber 51 and the system in which this deluge valve is used.

Assuming the valve is set as shown in FIG. 3, should a fire occur in the material being protected, then an electrical signal will ignite primers 102 and 103. The explosion caused by this ignition will be transmitted against the anvil 108 of the retainer latch 64. This retainer latch will be driven to the right in a clockwise direction (see FIG. 4) about the hinge 66. The shear pin 114 will be broken and spring blade 106 released by lip 65 thus transmitting an alarm from switch 105. Because the retainer latch extends about the ball 72 in an arcuate extent greater than 180° and because the slot 70 in the retainer member is larger than the diameter of either rod sections 62 or 73 of the pushrod the latch member will move without coming into contact with either of these sections and thereby remove the ball 72 without changing the transverse position of the rods.

With the ball removed there is no resistance to movement of the rod section 62 and thus pressure in the inlet 50 of the valve will force the clapper 40 upwardly and at the same time cause the latch 54 to rotate counter-clockwise and thus urge the section 62 to the left since no resistance is present to this movement. Without a fixed ball in place to hold the rod section 62 the valve will be thrust open and due to the primed condition in chamber 51 will speedily permit water to pass onto the combustible mixture being protected.

It is thus seen that the valve will be actuated because of movement of the ball 72 either longitudinally with the pushrod or transversely with retainer latch 64.

It is to be understood that the above description and accompanying drawings are to be deemed primarily as illustrative of the preferred mode presently contemplated of carrying out the principles of the invention, and that the device, described and illustrated may be modified or altered in its form proportions, detail of construction and arrangement of parts without departing from the spirit and scope of the invention as defined in the appended claims.

What we claim and desire to secure by Letters Patent is:
1. In a deluge valve containing:
  (A) a valve body,
  (B) an inlet portion,
  (C) an outlet portion,
  (D) a flow chamber in said valve body communicating between said inlet and outlet portions,
  (E) hinged clapper means in said flow chamber fixed to said valve body for pivotal movement to and from a closed position with said inlet portion,
  (F) pivotal latch means for normally retaining said clapper means in a closed position,
the improvement comprising:
  (A) an actuating device joined to a side of said valve body including:
    (1) a pilot chamber exteriorly of said valve body and containing a movable diaphragm subject to movement due to pressure change in said chamber,

(2) a pushrod including one portion engaging said diaphragm and one end extending into said valve body in engaging relation with said latch means, said pushrod further including:
    (a) movable means interposed between said diaphragm and said latch for maintaining continuity of said rod between said diaphragm and said latch,
(3) explosive operable means for forcibly moving said movable means and disrupting the continuity of said rod,
    (a) said explosive operable means being electrically actuable,
whereby actuation of either said diaphragm, or said explosive operable means is sufficient in itself to cause movement of said movable means and so permit movement of said end of said rod out of normal retaining engagement with latch to thereby permit opening of said valve clapper.

2. In a deluge valve containing:
(A) a valve body,
(B) an inlet portion,
(C) an outlet portion,
(D) a flow chamber in said valve body communicating between said inlet and outlet portions,
(E) hinged clapper means in said flow chamber fixed to said valve body for pivotal movement to and from a closed position with said inlet portion,
(F) pivotal latch means for normally retaining said clapper means in a closed position,
the improvement comprising:
(A) an actuating device joined to an outer side wall of said valve body including:
  (1) a pilot chamber exteriorly of said valve body and containing a movable diaphragm subject to movement due to pressure change in said chamber,
  (2) an elongate pushrod within said device having two ends with one end engaging said diaphragm and the other end extending into said valve body and engaging said latch means, said push-rod containing:
    (a) a plurality of spaced separable longitudinally aligned elongate sections,
    (b) means interposed between said sections for normally maintaining said sections in spaced relation,
  (3) explosive operable means for removing said interposed means,
whereby releasing movement of either said diaphragm or said interposed means is sufficient in itself of causing movement of said other end of said rod to release said latch means from its retention of said clapper means and thereby permit opening of said clapper means.

3. In a deluge valve containing:
(A) a valve body,
(B) an inlet portion,
(C) an outlet portion,
(D) a flow chamber in said valve body communicating between said inlet and outlet portions,
(E) hinged clapper means in said flow chamber fixed to said valve body for pivotal movement to and from a closed position with said inlet portion,
(F) pivotal latch means for normally retaining said clapper means in a closed position,
the improvement comprising:
(A) an actuating device joined to a side of said valve body including:
  (1) a substantially cylindrical container fastened at one end to said valve body,
  (2) a pilot chamber being at the other end of said cylindrical container and containing:
    (a) a diaphragm movable with a change in pressure in said pilot chamber,
  (3) a sectional pushrod within said container formed of at least two spaced separable aligned sections and extending between said diaphragm and said latch means,
    (a) one end of said rod engaging said diaphragm,
    (b) the other end of said rod extending beyond said one end of said container into said flow chamber and being engageable with said latch means for normally maintaining said latch means in retaining relation with said clapper means,
  (4) removable means interposed between said separable sections for normally maintaining said separable sections in spaced longitudinally aligned relation,
  (5) explosive means adjacent said removable means for removing said removable means from between said separable sections,
    (a) said explosive means being electrically actuable,
whereby actuation of either said diaphragm or said removable means is sufficient in itself to cause movement of said other end of said rod out of normal retaining engagement with said latch to thereby permit opening of said valve clapper.

4. A combination as set forth in claim 3 wherein said removable means is a ball normally retained between said separable sections by a movable retainer member.

5. A combination as set forth in claim 4 wherein said movable retainer member is a hinged partial cylindrical member containing said ball and wherein the arcuate circumferential extent of the partial cylindrical member about said ball is greater than 180° and less than 360°.

6. A valve comprising:
(A) a valve body defining a flow chamber therein having an inlet portion and an outlet portion,
(B) a seat on said inlet portion,
(C) a clapper member in said flow passage pivotally mounted for sealing engagement with said seal,
(D) movable latch means in said valve body for normally retaining said clapper means in a closed position,
(E) a container fastened exteriorly of said valve body,
(F) a pilot chamber joined to said container and containing a diaphragm movable with a change in pressure in said pilot chamber,
(G) a pushrod within said container including a portion engaging said diaphragm and one end extending into said valve body in a normally engaging relation with said latch for said latch to normally retain said clapper,
(H) movable means coincident with said pushrod and interposed in retaining contact with said pushrod between said diaphragm and said latch, said movable means being movable longitudinally of said rod and transversely of said rod,
(I) explosive operable means for forcibly moving said movable means out of retaining contact with said rod,
whereby actuation of either said diaphragm or said explosive operable means is sufficient in itself to cause movement of said movable means and so move said end of said rod out of normal retaining engagement with said latch to thereby permit opening of said valve clapper.

7. A valve comprising:
(A) a valve body defining a flow chamber therein having an inlet portion and an outlet portion,
(B) a seat on said inlet portion,
(C) a clapper member in said flow passage pivotally mounted for sealing engagement with said seat,
(D) pivotal latch means in said valve body for normally retaining said clapper means in a closed position,
(E) a substantially cylindrical container having two ends with one end fastened to an exterior side wall of said valve body, (F) a pilot chamber at the other end of said container containing a diaphragm movable with a change in pressure in said pilot chamber,
(G) an elongate pushrod within said container extending parallel to the axis of said container and having two ends with one end engaging said diaphragm and the other end extending into said valve body and engaging said latch means, said pushrod containing:
  (1) a plurality of spaced separable longitudinally aligned elongate sections,
  (2) means interposed between said sections for normally maintaining said sections in spaced relation, said means:
    (a) being movable longitudinally with said rod away from said latch means,
    (b) being removably movable transversely of said rod,
(H) means within said container, for normally retaining said interposed means between said sections and for removing said interposed means from between said sections transversely of said rod,
(I) explosive means adjacent said removing means for impelling said removing means from its normal retaining position,
whereby movement of said interposed means either longitudinally away from said latch or transversely away from said rod is sufficient in itself to permit said other end of said rod to move away from said latch means to release said latch means from its retention of said clapper means and thereby permit opening of said clapper means.

8. A combination as called for in claim 7 wherein:
(A) said interposed means is a ball of larger diameter than the cross-sectional extent of said elongate sections,
(B) said means within said container, for normally retaining said interposed means, is a transversely movable longitudinally slotted cylindrical sleeve capable of containing and transversely removing said ball without transversely disorienting said sections.

9. A valve comprising:
(A) a valve body defining a flow chamber therein having an inlet portion and an outlet portion,
(B) a seat on said inlet portion,
(C) a clapper member in said flow passage pivotally mounted for sealing engagement with said seat,
(D) pivotal latch means in said valve body for normally retaining said clapper means in a closed position,
(E) a substantially cylindrical container having two ends with one end fastened to an exterior side wall of said valve body,
(F) a pilot chamber at the other end of said container containing a diaphragm movable with a change in pressure in said pilot chamber,
(G) an elongate pushrod within said container extending parallel to the axis of said container and having two ends with one end engaging said diaphragm and the other end extending into said valve body and engaging said latch means, said pushrod containing:
  (1) two spaced separable longitudinally aligned elongate cylindrical sections,
  (2) a ball interposed between said sections for normally maintaining said sections in spaced relation:
    (a) said ball being larger in diameter than said rod sections,
(H) a cylindrical shell having a longitudinal slot through and along one side extending the length of said sleeve,
  (1) said slot:
    (a) being in width less than 180° of the circular cross-section of said cylindrical sleeve,
    (b) being greater in width than the cross-sectional diameter of said cylindrical sections, and
    (c) being smaller in width than the diameter of said ball,
  (2) said sleeve:
    (a) being pivotally joined to the interior of said container for movement transverse of said rod,
    (b) containing said ball for longitudinal movement in said sleeve,
(I) explosive means adjacent said sleeve for impelling said sleeve transversely of said sections to carry said ball from between said sections while permitting said sections to pass through said slot,
whereby actuation of said diaphragm which will produce longitudinal movement of said cylindrical sections and said ball in said sleeve or actuation of said explosive means which will produce transverse movement of said sleeve and ball is sufficient in itself to permit said other end of said rod to move away from said latch means to release said latch means from its retention of said clapper means and thereby permit opening of said clapper means.

10. An actuator for a valve comprising:
(A) a substantially cylindrical container,
(B) a pushrod extending longitudinally within said container and parallel to the axis of said container, said rod:
  (1) having one end extending from one end of said container and adapted to engage a latch mechanism,
  (2) having its other end extending from the other end of said container adapted to engage a pressure responsive device,
(C) means intermediate the ends of said pushrod adapted to move longitudinally with said pushrod and transversely of said pushrod to permit inward movement of said one end of said rod,
(D) explosive operable means for impelling said intermediate means transversely of said rod.

11. An actuator for a valve comprising:
(A) a substantially cylindrical container,
(B) a pushrod extending longitudinally within said container and parallel to the axis of said container, said rod:
  (1) having one end extending from one end of said container and adapted to engage a latch mechanism,
  (2) having its other end extending from the other end of said container adapted to engage a pressure responsive device,
  (3) containing two spaced separable longitudinally aligned elongate sections and a ball of larger diameter than the cross-sectional extent of said elongate sections interposed between said sections,
(C) a substantially cylindrical sleeve pivotally joined to the interior of said cylinder for transverse movement with respect to said rod, said sleeve:
  (1) containing said ball for longitudinal movement in said sleeve,
  (2) having a longitudinal slot extending through and along the entire length of one side of said sleeve which is:
    (a) in width less than 180° of the circular cross-section of said cylindrical sleeve,
    (b) greater in width than the cross-sectional extent of said sections,
    (c) smaller in width than the diameter of said ball,
(D) explosive means adjacent said sleeve for impelling said sleeve transversely of said sections to carry said ball from between said sections and permit passage of said sections through said slot.

(References on following page)

References Cited by the Examiner

UNITED STATES PATENTS

| | | | |
|---|---|---|---|
| 1,932,324 | 10/1933 | Rowley | 169—19 |
| 2,506,468 | 5/1950 | Rider | 169—19 |
| 2,586,720 | 2/1952 | Rowley | 169—19 |
| 2,713,916 | 7/1955 | Muckenfuss | 169—19 |
| 2,910,082 | 10/1959 | Ferguson | 137—68 |
| 3,064,739 | 11/1962 | Hanson et al. | 169—2 |
| 3,135,330 | 6/1964 | Hanson et al. | 169—2 |

FOREIGN PATENTS 128,261   7/1948   Australia.

EVERETT W. KIRBY, *Primary Examiner.*